May 6, 1924.
J. L. ABBEY
WATER MOTOR
Filed Dec. 23, 1922
1,493,412
2 Sheets-Sheet 1
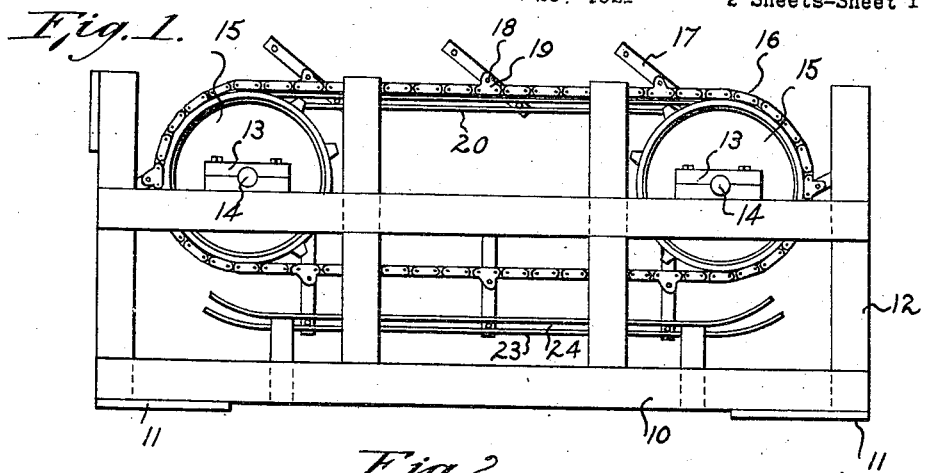
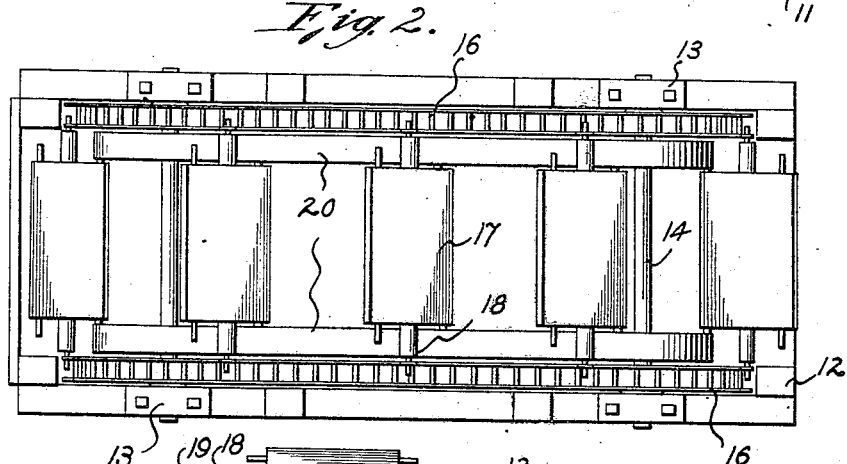
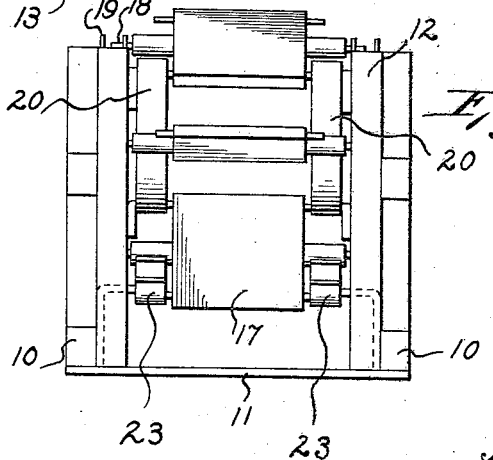
John L. Abbey
INVENTOR
BY Victor J. Evans
ATTORNEY
WITNESS:

May 6, 1924.
J. L. ABBEY
WATER MOTOR
Filed Dec. 23, 1922
1,493,412
2 Sheets-Sheet 2
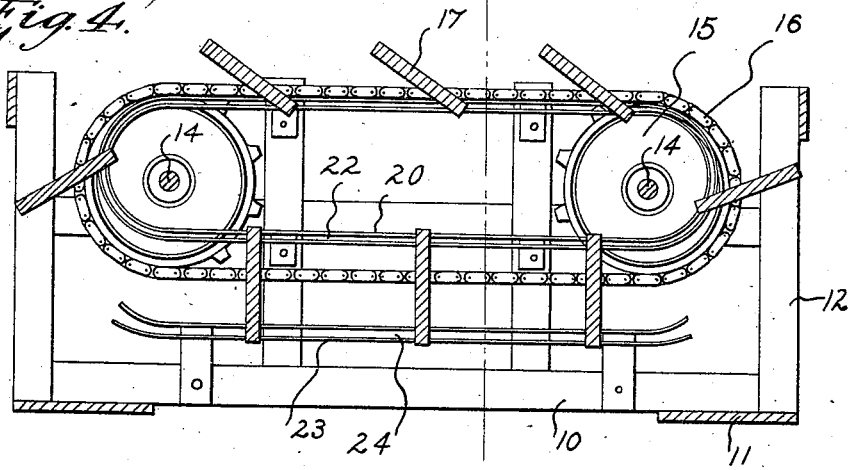
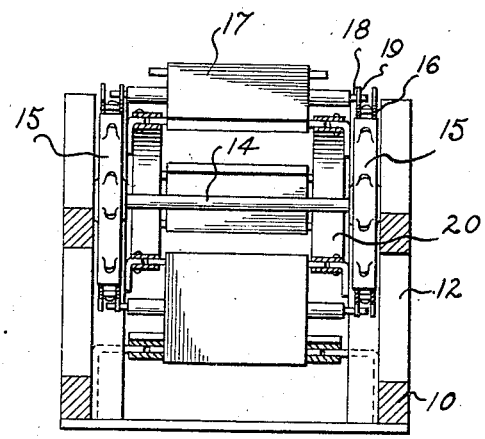
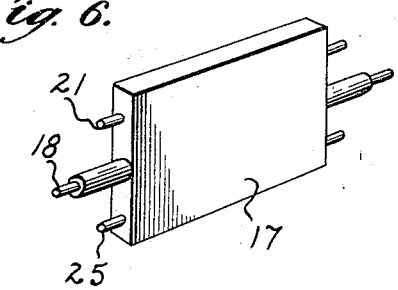
John L. Abbey
INVENTOR
BY Victor J. Evans
ATTORNEY
WITNESS Patented May 6, 1924.

1,493,412

UNITED STATES PATENT OFFICE.

JOHN L. ABBEY, OF CAMANCHE, IOWA.

WATER MOTOR.

Application filed December 23, 1922. Serial No. 608,678.

*To all whom it may concern:*

Be it known that I, JOHN L. ABBEY, a citizen of the United States, residing at Camanche, in the county of Clinton and State of Iowa, have invented new and useful Improvements in Water Motors, of which the following is a specification.

This invention relates to improvements in water motors and has for an object the provision of a simple, strong and durable machine which, when subjected to the action of water, will provide power for various purposes.

Another object of the invention is the provision of a water motor which may be operated by the movement of tides or by the movement of any running stream, the construction being such that the motor will operate with the tide moving in either direction, so as to provide a continuous source of power.

Another object of the invention is the provision of a motor which may be either stationarily positioned, or arranged to rise and fall with the action of the tide.

With the above and other objects in view, the invention further includes the following novel features and details of construction, to be hereinafter more fully described, illustrated in the accompanying drawings and pointed out in the appended claim.

In the drawings:—

Figure 1 is a side elevation of a water motor constructed in accordance with the invention.

Figure 2 is a plan view of the same.

Figure 3 is an end view.

Figure 4 is a central longitudinal sectional view.

Figure 5 is a transverse sectional view.

Figure 6 is a detail perspective view of one of the paddles.

Referring in detail to the drawings, wherein like characters of reference denote corresponding parts, the motor as shown comprises a frame which includes longitudinal bars 10, transverse bars 11 and standards 12, the latter being suitably spaced to receive the operating mechanism.

Mounted in bearings 13 secured to the longitudinal bars 10 are spaced transversely arranged shafts 14, which have mounted near each end thereof sprocket wheels 15, over which travel sprocket chains 16.

Positioned between the chains 16 are paddles 17 which are substantially rectangular and which have extending from each end thereof trunnions 18. These trunnions are mounted in bearings 19 which are carried by and arranged at spaced intervals along the chains 16, so that the paddles will be capable of pivotal movement between said chains.

Secured to the frame at opposite sides thereof and within each of the chains 16 is a substantially elliptical guide 20, having spaced upper and lower parallel portions and substantially semi-circular end portions connecting the parallel portions, the semi-circular portions being arranged eccentrically with respect to the shafts 14. Extending outwardly from opposite ends of the paddles 17 near one edge thereof are pins 21, which are adapted to enter and travel in slots 22 provided in the guide members 20 so as to regulate the position of the paddles 17 in their travel. By reference to the drawings it will be seen that when the paddles are traveling along the upper flight of the chain, they will assume a substantially horizontal position, due to the proximity of the guide to the chain, and when the said paddles are traveling along the lower fight they will assume a position substantially at right angles to the direction of travel, due to the increased space between the guide and chain. This change in position of the paddles will occur irrespective of their direction of travel, so that when the movement of the water acts upon the paddles traveling along the lower flight of chain, resistance offered to the travel of the paddles in an opposite direction will be materially reduced by the change of position of the paddles along the upper fight of the chain. This is true whether the paddles are traveling in the direction of the arrow shown in Figure 4, or in a reverse direction, so that when the tide running in one direction acts upon the paddles to operate the motor, the operation of the latter will continue after the direction of travel of the tide changes, the motor merely changing its direction of operation. This change in direction of operation of the motor may be compensated for by any suitable reversing mechanism provided in the mechanism which is operated by the motor and which constitutes no part of the present invention.

In addition to the guide 20, there is provided upon opposite sides of the frame an auxiliary guide 23, which is provided with a longitudinally disposed slot 24 for the reception of a pin 25, one of which extends from each end of the paddles 17. The engagement of the pins 25 in the slots 24 acts to stabilize the paddles during the action of the water thereon.

The invention is susceptible of various changes in its form, proportions and minor details of construction and the right is herein reserved to make such changes as properly fall within the scope of the appended claim.

Having described the invention what is claimed is:—

A water motor comprising a frame, spaced parallel sprocket chains operating therein, spaced transversely disposed paddles between and pivotally connected to the sprocket chains, a continuous guide located upon each side of the frame and surrounded by each of the chains, pins extending from the opposite ends of the paddles for travel in the continuous guides to regulate the position of the paddles, and additional guide upon each side of the frame upon the outside of the chains, pins also extending from the opposite ends of the paddles and engaging the additional guide when the paddles are traveling in one direction only.

In testimony whereof I affix my signature.

JOHN L. ABBEY.